(12) United States Patent
Foulds et al.

(10) Patent No.: US 9,709,826 B2
(45) Date of Patent: Jul. 18, 2017

(54) OCULAR LENS

(71) Applicant: SINGAPORE HEALTH SERVICES PTE. LTD., Singapore (SG)

(72) Inventors: Wallace Stewart Foulds, Singapore (SG); Chi Dzung Luu, Singapore (SG)

(73) Assignee: SINGAPORE HEALTH SERVICES PTE. LTD., Singapore (SG)

( * ) Notice: Subject to any disclaimer, the term of this patent is extended or adjusted under 35 U.S.C. 154(b) by 0 days.

(21) Appl. No.: 14/670,573

(22) Filed: Mar. 27, 2015

(65) Prior Publication Data

US 2015/0198820 A1 Jul. 16, 2015

Related U.S. Application Data

(62) Division of application No. 13/876,475, filed as application No. PCT/SG2011/000338 on Sep. 28, 2011, now Pat. No. 9,074,750.

(60) Provisional application No. 61/387,020, filed on Sep. 28, 2010.

(51) Int. Cl.
| | |
|---|---|
| *G02C 7/10* | (2006.01) |
| *F21V 9/08* | (2006.01) |
| *G02C 7/04* | (2006.01) |

(52) U.S. Cl.
CPC .............. *G02C 7/104* (2013.01); *F21V 9/08* (2013.01); *G02C 7/04* (2013.01); *G02C 7/10* (2013.01); *G02C 2202/24* (2013.01)

(58) Field of Classification Search
CPC .......... G02C 7/10; G02C 7/101; G02C 7/102; G02C 7/104; G02C 7/105; G02C 7/107; G02C 7/108
USPC .......................... 351/159.49, 159.59–159.65; 359/885–892
See application file for complete search history.

(56) References Cited

U.S. PATENT DOCUMENTS

| | | | |
|---|---|---|---|
| 5,408,278 A | 4/1995 | Christman | |
| 5,592,245 A | 1/1997 | Moore et al. | |
| 5,922,246 A | 7/1999 | Matsushita et al. | |
| 6,612,697 B1 * | 9/2003 | Aurelius | G02B 5/226 351/159.62 |
| 6,826,001 B2 * | 11/2004 | Funakura | G02B 5/223 252/586 |
| 2007/0001188 A1 | 1/2007 | Lee | |
| 2007/0188678 A1 | 8/2007 | Kim et al. | |
| 2008/0094829 A1 | 4/2008 | Narendran et al. | |
| 2008/0137030 A1 * | 6/2008 | Hoffman | G02C 7/04 351/159.24 |
| 2013/0250235 A1 | 9/2013 | Foulds et al. | |

FOREIGN PATENT DOCUMENTS

| | | |
|---|---|---|
| EP | 1489891 A1 | 12/2004 |
| JP | 2001-133625 A | 5/2001 |
| JP | 2003-149604 A | 5/2003 |
| WO | 9731286 A1 | 8/1997 |
| WO | 02063370 A1 | 8/2002 |
| WO | 03023497 A1 | 3/2003 |

OTHER PUBLICATIONS

Chua, W., et al., "Atropine for the Treatment of Childhood Myopia", "Ophthalmology", Dec. 2006, pp. 2285-2291, vol. 113, No. 12.
Dirani, M., et al, "Outdoor activity and myopia in Singapore teenage children", "Br. J. Ophthalmol.", Feb. 11, 2009, pp. 997-1000, vol. 93.
Goldschmidt, E., "The mystery of myopia", "Acta Ophthalmol. Scand.", 2003, pp. 431-436, vol. 81.
Hood, D., et al., "Enhanced S Cone Syndrome: Evidence for an Abnormally Large Number of S Cones", "Vision Res.",1995, pp. 1473-1481, vol. 35, No. 10.
Ip, J., et al., "Role of Near Work in Myopia: Findings in a Sample of Australian School Children", "Investigative Ophthalmology and Visual Science", Jul. 2008, pp. 2903-2910, vol. 49, No. 7.
Irving, E., et al., "Inducing Myopia, Hyperopia, and Astigmatism in Chicks", "Optometry and Vision Science", 1991, pp. 364-368, vol. 68, No. 5.
Lamb, T., et al., "Spatial Spread of Activation and Background Desensitization in Toad Rod Outer Segments", "J. Physiol.", 1981, pp. 463-496, vol. 319.
Mandelman, T., et al., "Longitudinal Chromatic Aberration of the Vertebrate Eye", "Vision Res.", 1983, pp. 1555-1559, vol. 23, No. 12.
Marmor, M., et al., "Diagnostic clinical findings of a new syndrome with night blindness, maculopathy and enhanced S cone sensitivity", "American Journal of Ophthalmology", Aug. 1990, pp. 124-134, vol. 110.
Morgan, I., et al., "How genetic is school myopia?", "Progress in Retinal and Eye Research", 2005, pp. 1-38, vol. 24.
Mutti, D., et al., "Parental Myopia, Near Work, School Achievement, and Childrens Refractive Error", "Investigative Ophthalmology and Visual Science", Dec. 2002, pp. 3633-3640, vol. 43, No. 12.
Organisciak, D., et al., "Retinal light damage: Mechanisms and protection", "Progress in Retinal and Eye Research", Mar. 2010, pp. 113-134, vol. 29.
Pask, C., et al., "Optical Properties of Retinal Photoreceptors and the Campbell Effect", "Vision Res.", 1998, pp. 953-961, vol. 38, No. 7.
Pickett-Seltner, R., et al., "Experimentally Induced Myopia in Chicks: Morphometric and Biochemical Analysis During the First 14 Days After Hatching", "Vision Res.", 1988, pp. 323-328, vol. 28, No. 2.

(Continued)

*Primary Examiner* — Darryl J Collins
(74) *Attorney, Agent, or Firm* — Hultquist, PLLC; Steven J. Hultquist

(57) ABSTRACT

According to embodiments of the present invention, an ocular lens is provided. The ocular lens includes an optical filter configured to change a chromaticity of light impinging on the ocular lens so as to transmit a filtered light to an eye of a viewer, wherein the filtered light comprises a first light having a first peak wavelength in a range of between about 460 nm and about 490 nm and a second peak wavelength in a range of between about 490 nm and about 550 nm.

2 Claims, 14 Drawing Sheets

(56) References Cited

OTHER PUBLICATIONS

Qian, Y., et al., "Incidence of Myopia in High School Students with and without Red-Green Color Vision Deficiency", "Investigative Ophthalmology and Visual Science", Apr. 2009, pp. 1598-1605, vol. 50, No. 4.

Rohrer, B., et al., "Longitudinal Chromatic Aberration and Emmetropization: Results From the Chicken Eye", "Journal of Physiology", 1992, pp. 363-376, vol. 449.

Rose, K., et al., "Myopia, Lifestyle, and Schooling in Students of Chinese Ethnicity in Singapore and Sydney", "Arch Ophthalmol.", Apr. 2008, pp. 527-530, vol. 126, No. 4.

Rose, K., et al., "Outdoor Activity Reduces the Prevalence of Myopia in Children", "Ophthalmology", Aug. 2008, pp. 1279-1285, vol. 115.

Rucker, F., et al., "Cone contributions to signals for accommodation and the relationship to refractive error", "Vision Research", 2006, pp. 3079-3089, vol. 46.

Rucker, F. et al., "Chick eyes compensate for chromatic simulations of hyperopic and myopic defocus: Evidence that the eye uses longitudinal chromatic aberration to guide eye-growth", "Vision Research", Jul. 2009, pp. 1775-1783, vol. 49.

Sankaridurg, P., et al., "Spectacle Lenses Designed to Reduce Progression of Myopia: 12-Month Results", "Optometry and Vision Science", Sep. 2010, pp. 631-641, vol. 87.

Saw, S., et al., "Nearwork and myopia in young children", "The Lancet", Feb. 3, 2001, p. 390 vol. 357.

Saw, S., et al., "Interventions to Retard Myopia Progression in Children", "Ophthalmology", 2002, pp. 415-421, vol. 109.

Schaeffel, F., et al., "Accommodation, Refractive Error and Eye Growth in Chickens", "Vision Research", 1988, pp. 639-657, vol. 28, No. 5.

Schaeffel, F., et al., "Properties of the Feedback Loops Controlling Eye Growth and Refractive State in the Chicken", "Vision Research", 1991, pp. 717-734, vol. 31, No. 4.

Seidemann, A., et al., "Effects of longitudinal chromatic aberration on accommodation and emmetropization", "Vision Research", 2002, pp. 2409-2417, vol. 42.

Stiles, W., et al., "The luminous efficiency of rays entering the eye pupil at different points", "Proc R Soc", 1933, pp. 428-450, vol. 112.

Wallman, J., et al., "Extreme Myopia Produced by Modest Change in Early Visual Experience", "Science", Sep. 29, 1978, pp. 1249-1251, vol. 201.

Westheimer, G., "Directional sensitivity of the retina: 75 years of Stiles-Crawford effect", "Proc. R. Soc. B", Sep. 2, 2008, pp. 2777-2786, vol. 275.

Wildsoet, C., et al., "Emmetropization in chicks uses optical vergence and relative distance cues to decode defocus", "Vision Research", 2001, pp. 3197-3204, vol. 41.

Nov. 28, 2014 Office Action issued in U.S. Appl. No. 13/876,475 by Darryl J. Collins.

Kroeger, R., et al., "Use of paper selectively absorbing long wavelengths to reduce the impact of educational near work on human refractive development", British Journal of Ophthalmology, Aug. 2000, pp. 890-893, vol. 84, No. 8.

* cited by examiner

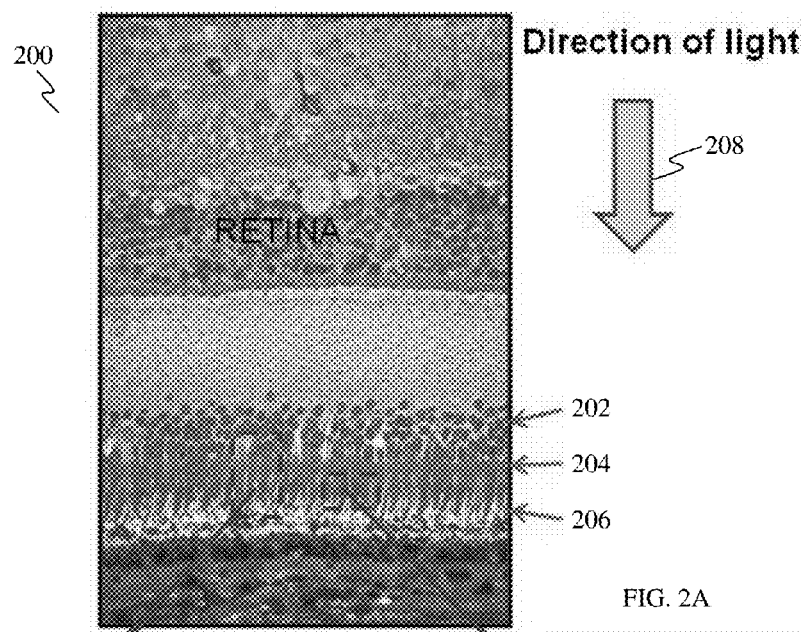
FIG. 2A
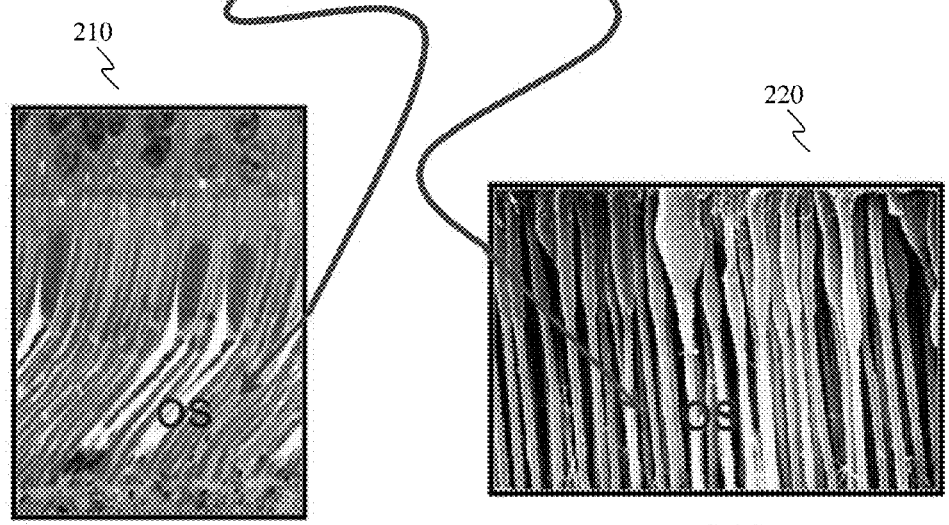
FIG. 2B
FIG. 2C

FIG. 3A
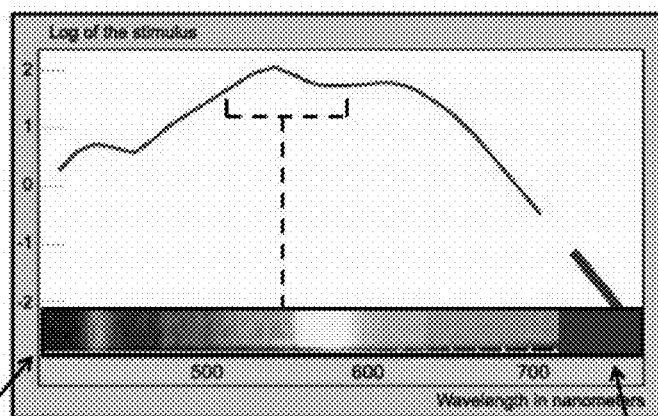
Modified from Ripps and Weale (1976)
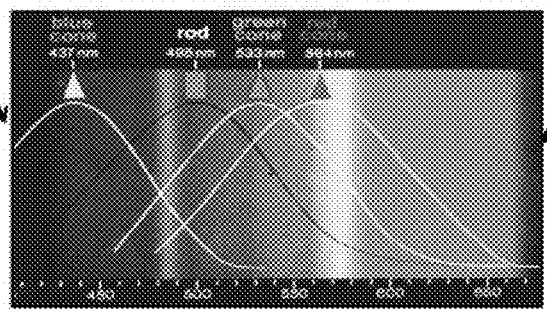
FIG. 3B
Modified from Dowling (1987)

OCULAR LENS

CROSS-REFERENCE TO RELATED APPLICATIONS

This is a divisional application under 35 U.S.C. §120 of U.S. patent application Ser. No. 13/876,475 filed Mar. 27, 2013, which is a U.S. national phase application under 35 U.S.C. §371 of International Patent Application No. PCT/SG11/00338 filed Sep. 28, 2011, which in turn claims the benefit under 35 U.S.C. §119 of U.S. Provisional Patent Application No. 61/387,020 filed Sep. 28, 2010. The disclosures of such U.S. patent application, international patent application, and U.S. provisional patent application are hereby incorporated herein by reference, in their respective entireties, for all purposes.

TECHNICAL FIELD

Various embodiments relate to an ocular lens.

BACKGROUND

Myopia (short-sightedness) is reaching near epidemic proportions in many parts of the world and particularly so in Asia. Myopia tends to develop in childhood and progress in severity until adulthood is attained and in some cases beyond this. Myopia carries economic disadvantages by reducing career choices and in its higher degrees carries a risk of visual impairment or blindness from such complications such as retinal detachment or myopic macular degeneration. Myopia is also associated with the development of cataract and glaucoma.

The aetiology of myopia appears to be two-fold, including genetic predisposition and exposure to as yet undefined environmental factors. Currently, the relative contributions of genetic and environmental factors to the development of childhood myopia remain a matter of dispute (Goldschmidt E., Acta Ophthalmol Scand 2003; 81:431-6; Morgan I, Rose K., Prog Retire Eye Res 2005; 24:1-38). The increasing prevalence of myopia appears to be associated with urbanisation. Previously, it was thought that factors promoting myopia were excessive close work combined with genetic predisposition (Saw S M, et al., Lancet 2001; 357 (9253): 390; Mutti D O, et al., Invest Ophthalmol Vis Sci 2002; 42:3633-3640; Ip J M, et al., Invest Ophthalmol Vis Sci 2008; 49:2903-10). More recently, indoor activity unassociated with close work has been identified as a risk factor for childhood myopia (Rose K A, et al., Arch Ophthalmol 2008; 129:527-30). Outdoor activity has been shown to be protective against myopia and not just as a reciprocal of indoor activity (Rose K A, et al., Ophthalmology 2008; 115:1279-1285; Dirani M, et al., Br J Ophthalmol 2009; 93:997-1000).

Experimentally, young animals can be made myopic irrespective of their genetic makeup by modification of the visual input in early life. Thus, blurring of the visual image causes myopia in young animals (e.g. by lid closure) (Raviola E, Wiesel T N, N Engl J Med 1985; 312:1609-1615; Wallman J, et al., Science (Washington, D.C.) 1985; 201: 1249-51) or the wearing of a translucent goggle (Pickett-Seltner R L, et al., Vision Res 1988; 28:323-328). This very abnormal situation however does not account for the vast majority of myopia occurring in childhood where in general, affected persons have normal spectacle corrected vision.

It has been shown that in young experimental animals myopia can be induced by the wearing of negative (−ve) spectacle lenses or contact lenses while the wearing of positive (+ve) lenses can cause hyperopia (Holden A L, et al., Eye 1988; 2 Suppl: S242-56; Irving E L, et al., Optom Vis Sci 1991; 68:364-8; Schaeffel F, et al., Vision Res 1988; 28:639-57) even in conditions of monochromatic light (Schaeffel F, et al., Vision Res 1988; 28:639-57). For example, as shown in FIGS. 1A and 1B, the wearing of a −ve lens 100 causes the images of distant objects to be focused at a point 102 behind the retina 104 ('hyperopic blur'), while the wearing of +ve lens 106 causes distant objects to be focused at a point 108 in front of the retina 104 ('myopic blur'). In hyperopic blur (FIG. 1A), light traversing the retina 104 is convergent while in myopic blur (FIG. 1B), the light is divergent. The retina 104 may be able to differentiate between hyperopic and myopic blur and in the former case, to generate signals that lead to elongation of the eye and myopia.

It has been suggested that the retina uses the vergence of light traversing the retina to provide a cue to the sign (Wildsoet C F, Schmid K L. Vision Res 2001; 41:197-204) of the defocus (−ve or +ve vergence). It has also been suggested that the colour (chromatic content) of the light reaching the retina provides such cues (Seidemann A, Schaeffel F, Vision Res 2002; 42:2409-2417). There is no explanation however for the mechanisms that might allow the retina to react to the vergence of light so as to distinguish between convergent and divergent light or for the mechanisms that might allow the retina to react to chromatic cues and initiate alterations in the pattern of ocular growth and refractive development.

Attempts have been made to link chromatic-induced changes in accommodation to the etiology of myopia (Rohrer B, et al., J Physiol 1992; 449:363-376; Rucker F J, Kruger P B, Vision Res 2006; 46:3079-89; Rucker F J, Wallman J., Vision Res 2009; 49:1775-1783). There is however evidence that accommodation plays no direct etiological role in the development of myopia, for myopia can be induced by visual deprivation in experimental animals where accommodation has been surgically abolished (Troilo D. Wiley Chichester (Ciba Foundation Symposium 155) 1990; 155:89-102; discussion 102-14). It may be the case however that both accommodation and childhood myopia may be a reaction to the same stimulus, accommodation being a short term response to an out of focus image while induced myopia in experimental animals (and in humans) may be a long term response to the same features of the visual image (Wallmann J, CIBA Foundation Symposium 155, 1990 pp 1&3, John Wiley and Sons, Chichester).

Presently, one way of reducing progression of myopia is by the use of atropine eye-drops over an extended period of time (Saw S M, et al., Ophthalmology 2002; 109:415-21; Kennedy R H, et al., Binocul Vis Strabismus Q 2000; 15 (Suppl 3):281-304; Chua W H, et al., Ophthalmology 2006; 113:2285-91). Atropine has the disadvantage of dilating the pupils, causing glare and intolerance of light, and paralysis of accommodation so that sharp distance vision and near vision require either separate pairs of glasses or the use of bifocal glasses. The possible long-term adverse effects of light damage from chronically dilated pupils are not known. Myopia continues to progress when the eye-drops are discontinued.

Hyperopic overcorrection of myopia with +ve lenses may modify the rate of progression of already established myopia but such lenses while allowing a sharp image of near objects, sacrifice clarity of distance vision.

Spectacle lenses with a weaker −ve correction in the periphery than centrally have been tried with the intention of reducing the stimulus to myopia progression believed to be contributed by the relative hyperopia of the peripheral retina as compared to the central retina. So far, the effect on myopia progression has been significant but relatively small (Sankaridurg P., et al., Optom Vis Sci 2010; 87:631-41). Currently, contact lenses designed to overcome peripheral relative hyperopia are also undergoing evaluation.

SUMMARY

According to an embodiment, an ocular lens is provided. The ocular lens may include an optical filter configured to change a chromaticity of light impinging on the ocular lens so as to transmit a filtered light to an eye of a viewer, wherein the filtered light comprises a first light having a first peak wavelength in a range of between about 460 nm and about 490 nm and a second peak wavelength in a range of between about 490 nm and about 550 nm.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A shows a schematic diagram of a hyperopic blur induced by the wearing of a −ve lens, while

FIG. 2A shows a light microscopy image of a retina showing various layers in the outer retina, FIG. 2B shows a light microscopy image of an enlarged view of photoreceptors showing their outer segments (OS) while FIG. 2C shows a scanning electron microscopy image of the outer retina showing the photoreceptor outer segments (OS).

FIG. 3A shows the human spectral sensitivity curve, while FIG. 3B shows the spectral sensitivity curves for the three types of cones in the human retina.

FIG. 5A shows a photograph of an enclosure and a system for chick rearing, while

DETAILED DESCRIPTION

Figure 1A:
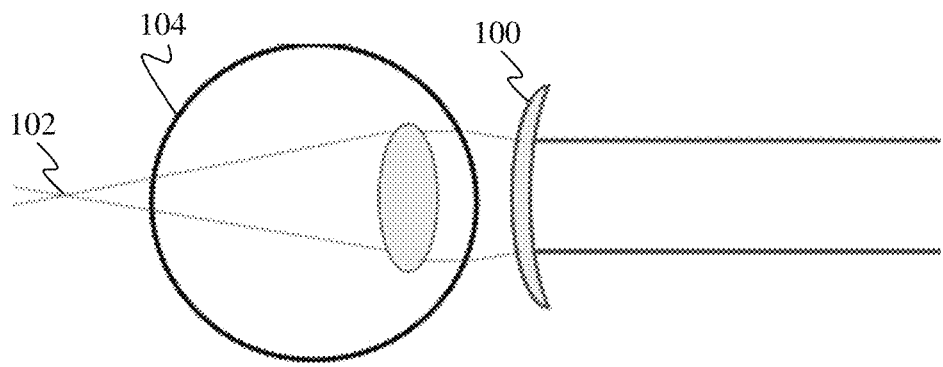

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

In the context of various embodiments, the phrase "at least substantially" may include "exactly" and a variance of +/−5% thereof. As an example and not limitations, "A is at least substantially same as B" may encompass embodiments where A is exactly the same as B, or where A may be within a variance of +/−5%, for example of a value, of B, or vice versa.

In the context of various embodiments, the term "about" or "approximately" as applied to a numeric value encompasses the exact value and a variance of +/−5% of the value.

Various embodiments may relate to the fields of biomedical technology, optics (e.g. ocular optics, lenses, spectacle lenses, contact lenses) and light sources, projection devices and display devices and their designs.

Various embodiments may prevent or minimise the occurrence of myopia in a person, may minimise or reduce the progression of myopia or may reverse the condition of myopia in a person by modification of the chromaticity of light incident upon the person's eye or pupil.

Various embodiments may facilitate the prevention or amelioration of childhood myopia by modification of the chromatic content of light incident upon the eye, for example during indoor activities. By changing the chromaticity of light to which young children are exposed to, alteration in ocular and refractive development may be effected to reduce the risk in children developing myopia or minimise its progression in those already affected, without or with minimised loss of sharp distance vision that accompanies the wearing of plus lenses.

Various embodiments may provide a device (e.g. an optical filter, an ocular device, a device such as a light source device, a display device or a projector device) and a method that may prevent or minimize the development of myopia or to slow its progression by altering or changing the chromatic content or chromaticity of light reaching the eye or light incident on the eye, for example during visual activities involving indoor activities where artificial light may have an excess of longer wavelength (red) light (i.e. the artificial light may have a larger proportion of red light or light in the red optical spectrum or wavelength range compared to other light(s) in the remaining optical spectrum or wavelength range, for example blue light).

This may be facilitated by using an approach based on the effects of chromaticity of light incident upon the eye in ocular and refractive developments, and which uses light of more than one wavelength or light in more than one wavelength range, for example using light having wavelengths or wavelength ranges in the blue and green portions of the optical spectrum (i.e. blue light and green light), to prevent or minimize the occurrence of myopia or reduce the progression of myopia, for example in children.

Light focused on the retina is absorbed in the outer segments (OS) of the photoreceptor cells that lie on the outer aspect of the retina. The photoreceptor OS are rod-like projections from the photoreceptor cells and lie closely together in an at least substantially parallel array, thereby forming the light sensitive and light absorbing outer layer of the retina.

FIG. 2A shows a light microscopy image 200 of a retina showing various layers in the outer retina, such as the layer of photoreceptor cell bodies 202, the layer of photoreceptor inner segments 204 and the layer of photoreceptor outer segments (OS) 206. In FIG. 2A, the arrow represented as 208 illustrates the direction of light incident on the retina.

FIG. 2B shows a light microscopy image 210 of an enlarged view of photoreceptors showing their outer segments (OS) while FIG. 2C shows a scanning electron microscopy image 220 of the outer retina showing the photoreceptor outer segments (OS) within which light is absorbed to initiate vision.

Photoreceptors are of two types, rods and cones. Rods are functional in the dark adapted eye (scotopic vision) while cones are functional in bright light conditions (photopic vision) and are responsible for colour vision. In the human, there are three types of cone, each sensitive to a different range of wavelengths (i.e. colour), such as red (L-cones), green (M-cones), and blue (S-cones) (long, medium and short wavelength sensitive cones respectively). The eye is not uniformly sensitive to all wavelengths of light reaching it, the eye being most sensitive to light in the mid-range of the visible spectrum at about 550 nm (for example green in the case of rods, yellow/green in the case of cones) (FIG. 3A). The spectral sensitivity curves of the three types of cone overlap (FIG. 3B).

The red cones have a maximal sensitivity in the yellow at a wavelength of about 564 nm, the green cones have a maximal sensitivity in the green at a wavelength of about 533 nm and the blue cones have a maximal sensitivity in the near ultraviolet portions of the visible spectrum at a wavelength of about 437 nm, but all cones have a range of wavelengths that they can absorb, where the range for the red cones encompasses both red and green wavelengths and the blue cones encompasses violet, blue and some green. All three cone types have some sensitivity in the green portion of the spectrum, which is greatest for the red cones and the green cones and least for the blue cones.

Figure 1B:
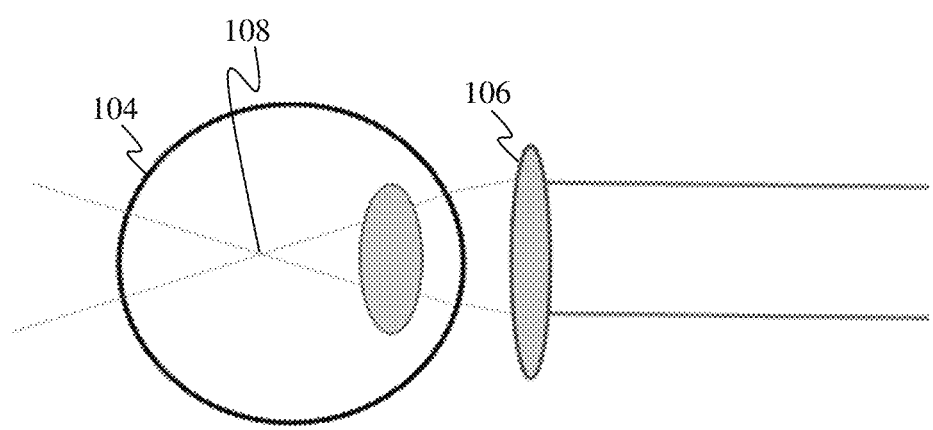
FIG. 1B shows a schematic diagram of a myopic blur induced by the wearing of a +ve lens.

The longer wavelength red light is focused more posteriorly than the shorter wavelength green or blue light (longitudinal chromatic aberration) and this is the basis of the duochrome test that is used to avoid overcorrection of the refractive error when prescribing glasses for the correction of myopia. In the duochrome test, by ensuring that black letters on a red background are more legible than similar letters on a green background, this ensures that longer red wavelengths are focused within the photoreceptor OS and not behind it (i.e. that the myopic error is not overcorrected). This test is not dependent on the recognition of colour and is equally effective in colour defective subjects. As red light is focused more posteriorly than blue light, red light traversing the retina is more convergent than blue light focused more anteriorly that is divergent in the retina. The red component of white light is focused just beyond the posterior tips of retinal photoreceptors in a normal eye, similar to that illustrated in FIG. 1A, while the blue component of white light is focused just in front of the bases of retinal photoreceptor in a normal eye, similar to that illustrated in FIG. 1B.

Figure 4A:
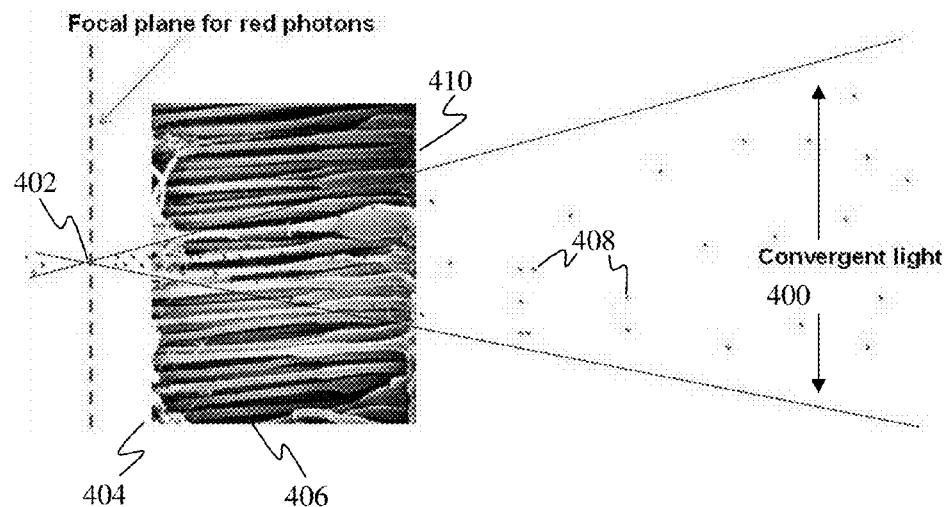
FIG. 4A shows a schematic diagram illustrating a convergent light coming to a focus beyond the tips of photoreceptor outer segments (OS).

The retina may be able to differentiate between convergent light passing through it (hyperopic blur) and divergent light (myopic blur), which could be related to the distribution of photons ("quantum catch") along the length of the photoreceptor OS where light incident upon the retina is absorbed in the outer segments (OS) of the retinal photoreceptors (rods and cones) to initiate the visual impulse that gives rise to visual perception. The retinal photoreceptor OS are long in comparison to the size of photons and in the conditions of convergent light (hyperopic blur), the density of photons in the OS increases towards the tips (sclera ends) of the OS (FIG. 4A). FIG. 4A shows a schematic diagram illustrating a convergent light 400 coming to a focus 402 beyond the tips 404 of the photoreceptor outer segments (OS) 406, resulting in an increased density of photons (red dots), as represented by 408 for two photons, at the OS tips 404 compared with the OS bases 410.

When the eye is in focus, the longer wavelength red light may be focused nearer the tips of the OS (for example at a point at a distal OS portion between the tip of the OS and the mid-point of the OS) compared to the shorter wavelength blue light that is focused nearer the OS bases (for example at a point at a proximal OS portion between the mid-point of the OS and the OS base).

Light captured by the photoreceptor OS enters the OS through their proximal faces and is directed distally in the OS by their waveguiding properties. In normal white light conditions where a retinal image contains an admixture of wavelengths from the short wavelength blue light to the long wavelength red light, accommodation may be largely determined by green wavelengths to which the retina is most sensitive and in these circumstances, the focal plane (FP) for the green wavelengths pass through the centres of the OS of all three cone types, i.e. through the centres of the OS not only of the M-cones but also through the centres of the OS of the S-cones and the L-cones, as illustrated in FIG. 4B for the L-cone 420, the M-cone 422 and the S-cone 424 photoreceptor outer segments (OS).

Figure 4B:
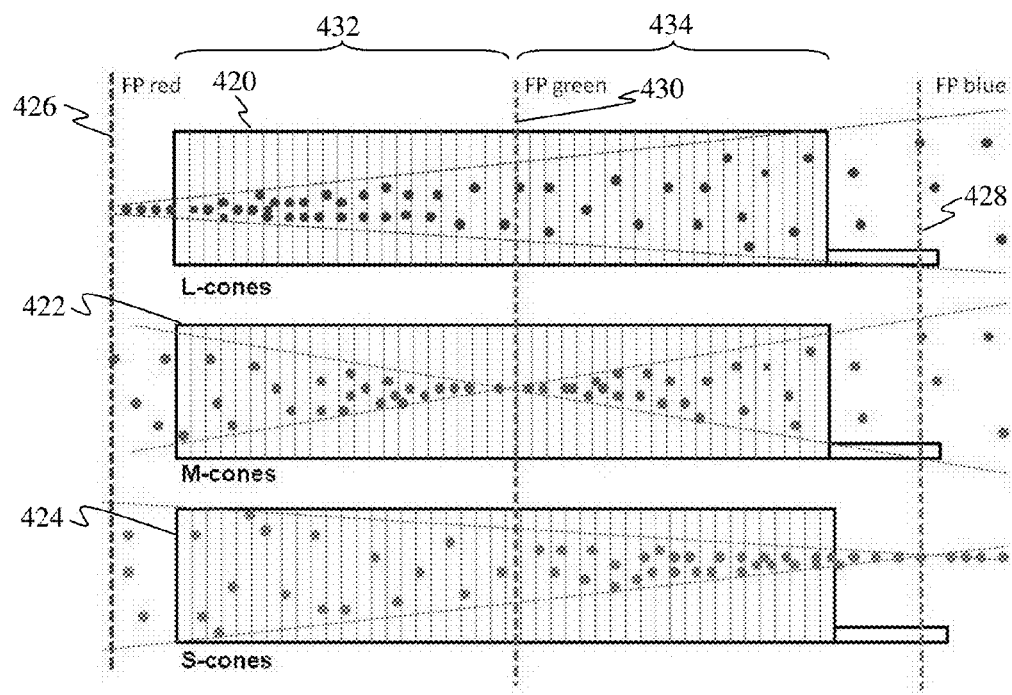
FIG. 4B shows a schematic diagram of the L-cone, M-cone and S-cone photoreceptor outer segments (OS), according to various embodiments.

As shown in FIG. 4B, there are three separate focal planes (FPs), one each for red, green and blue, where the red light FP 426 lie behind the tips of the L-cone OS 420 and the blue light FP 428 lies in front of the proximal bases of the S-cone OS 424, neither of which is within the respective cone OS.

Figure 4C:
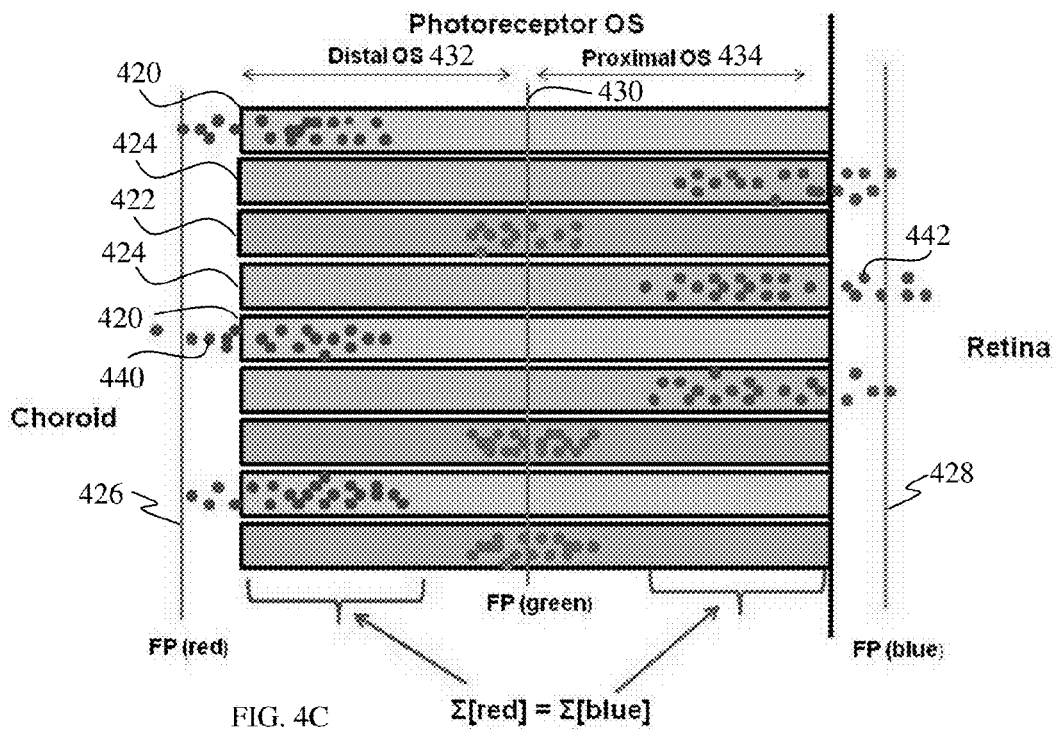
FIG. 4C shows a schematic diagram of the L-cone, M-cone and S-cone photoreceptor OS in white light, according to various embodiments.

FIG. 4C shows a schematic diagram of the L-cone 420, M-cone 422 and S-cone 424 photoreceptor OS in white light, according to various embodiments. The sum of photon catch (or resulting photochemical effect) of red photons (e.g. 440) in the OS tips at least substantially equals that of blue photons (e.g. 442) in the OS bases. With the green light focused in the mid-plane of the OS (i.e. the green light FP 430 focused at least substantially at the mid-point of the red-absorbing L-cone OS 420, the green-absorbing M-cone OS 422 and the blue-absorbing S-cone OS 424), the red light is convergent and the blue light is divergent along the length of the OS. Red light entering the proximal faces of the L-cones converges towards its focal point at the red light FP 426 just beyond the OS tips, while blue light focused just in front of the OS bases at the blue light FP 428 is divergent within the OS. The visible spectrum is accommodated within the length of the three cone types.

In the context of various embodiments, the term "accommodation" may generally refer to a process for adjusting optics of an eye by focusing on objects at different viewing distances.

The combined distribution of photons along the OS results in a balance between the number of photons in the L-cone 420 and the S-cone 424 in the distal OS 432 and the proximal OS 434 respectively, when summated across the photoreceptors, which may be expressed as photons per photoreceptor as there are fewer number of S-cones than L-cones although the disparity in the number may be a reflection of the higher energy of blue photons as compared with photons of longer wavelengths. The density of photons in FIG. 4C illustrates the probability of absorption of a photon (photon catch) along the length of the OS for photons of long, medium and short wave characteristics.

Figure 4D:
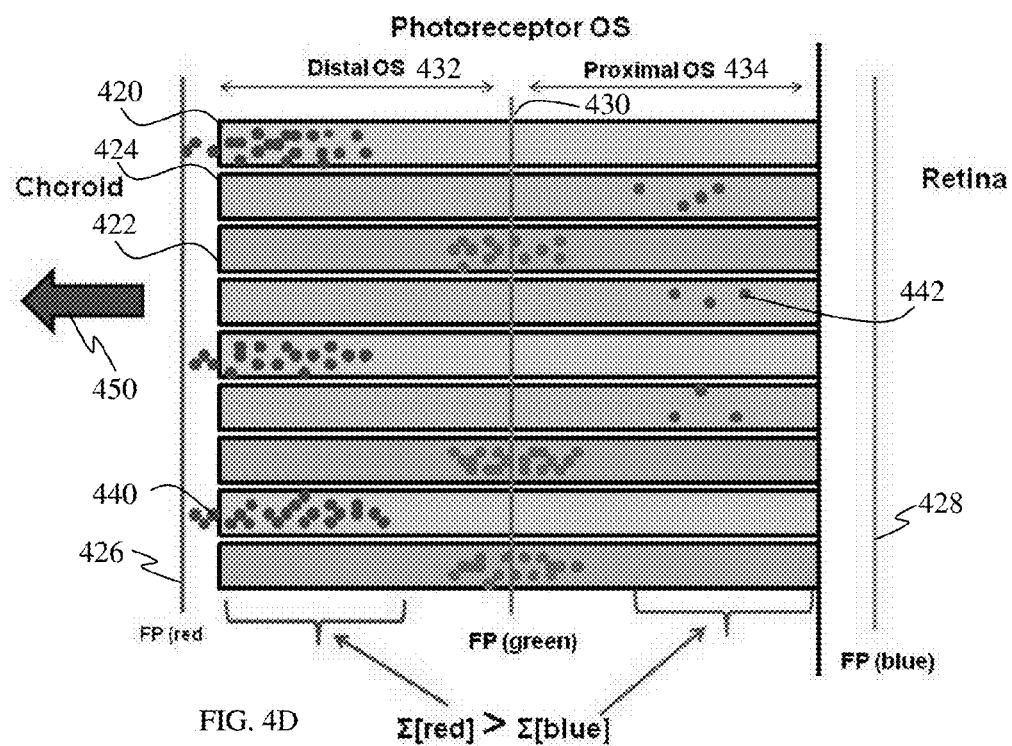
FIG. 4D shows a schematic diagram of the L-cone, M-cone and S-cone photoreceptor outer segments (OS) in the conditions of excess red light and a reduced blue light, according to various embodiments.

An imbalance between the photon densities (or their photochemical effect following their absorption) in the distal OS as opposed to the proximal OS (excess photon catch in the distal as compared to the proximal OS) may contribute to the development of myopia and cause its progression. For example, the young eye, such as the eye of a child, may be programmed or induced to grow in the direction of the greatest summated photon catch (or effect) in the photoreceptor distal OS as compared to the proximal OS. A preponderance of longer wavelengths (e.g. red light) in the distal OS may lead to axial elongation of the eye, resulting in myopia and a continuation of such an imbalance may cause a progressive increase in axial length and thereby increasing myopia, as illustrated in FIG. 4D. Conversely, a reverse imbalance may act to prevent or minimize ocular elongation and prevent or minimize myopia or may even result in hyperopia.

FIG. 4D shows a schematic diagram of the L-cone 420, M-cone 422 and S-cone 424 photoreceptor outer segments (OS) in the conditions of excess red light and a reduced blue light, with an amount of green light, according to various embodiments.

With accommodation of the eye determined by the mid-wavelength green photons, the green light FP 430 may lie at or near the mid-points of all three cone types (i.e. the L-cone 420, the M-cone 422 and the S-cone 424). With photon density (red photons, e.g. 440) of convergent red light increasing towards its focal point at the red light FP 426, there is an increasing photon catch towards the tips of the L-cones 420. With a reduced content of blue light and therefore reduced blue photons (e.g. 442), the blue photon catch in the S-cones 424 that is highest at the OS bases is significantly less than that of the red photon catch in the L-cone tips.

As the photoreceptor OS may be sensitive to the differential distribution of photon catch along their lengths, a balanced distribution of photon catch on either side of the OS mid-points may be required for emmetropisation, i.e. normal growth of the eye and the avoidance or minimization of the occurrence of refractive errors such as myopia.

As the young eye, for example the eye of a child, may be programmed or induced to grow in a direction of the highest photon density (or photon catch) in the OS, an excess or increased proportion of red light or density of red photons (in the presence of some green light) at or near the OS tips may stimulate or cause the elongation of the developing eye in the direction of the arrow 450, resulting in the development of myopia, while an excess or increased proportion of blue light or density of blue photons (in the presence of some green light) at or near the OS bases may provide the opposite effect so as to be protective against the development of myopia.

Therefore, the distribution of photon density along the OS may be the stimulus that may determine short-term fluctuations in accommodation, and in the longer term, the pattern of ocular and refractive development in the young eye.

For white light having all the colours of the visible spectrum, the presence of a proportion of mid-wavelength light (e.g. green light or green component of white light) may enable the mid-wavelength green light to be focused approximately at the mid-points of the OS, as well as facilitating the confinement of the red wavelengths (i.e. red component of white light) at least substantially within the distal OS and the blue wavelengths (i.e. blue component of white light) at least substantially within the proximal OS.

In conditions of monochromatic light (e.g. red), the eye may accommodate to the available wavelengths so that the focal plane for these wavelengths is centred at or near the mid-point of the cone OS with no or minimal imbalance between the OS tips and OS bases, with an expected normal ocular development and emmetropisation.

Altering or changing the chromaticity of light to provide a proportion of green light or photons to maintain the focal plane for green wavelengths at or near the mid-point of the OS, and a higher proportion of blue light or photons at least substantially at the OS bases, coupled with an absence or a reduction in the proportion of red light or photons in the OS, compared to the proportion of the blue photons, may prevent or reduce myopia, or halt or slow its progression.

The approach of modification of the chromaticity of light as described in various embodiments may be applied to various apparatus or devices such as reading lights, light sources, lighting system (e.g. at home or in school), display devices (e.g. computer screens), projector devices and ocular lenses (e.g. spectacle lenses or contact lenses) and their manufacturing processes. Such apparatus or devices may be custom-built and/or custom-designed or modified from available devices to achieve the appropriate transmission of light with the desired chromaticity.

Various embodiments may provide an ocular lens. The ocular lens includes an optical filter configured to change a chromaticity of light impinging on the ocular lens so as to transmit a filtered light to an eye of a viewer, wherein the filtered light comprises a first light having a first peak wavelength in a range of between about 460 nm and about 490 nm (e.g. blue region light) and a second peak wavelength in a range of between about 490 nm and about 550 nm (e.g. green region light).

In various embodiments, the optical filter may be disposed on a surface of the ocular lens, for example on an outer surface of the ocular lens, distal to the eye of the viewer, or may be integral with the ocular lens.

In various embodiments, the ocular lens may be further configured for refractive correction. The ocular lens may be an aspheric lens. The ocular lens may be a spectacle lens or a contact lens.

In the context of various embodiments, the filtered light may further include a second light in a wavelength range of between about 530 nm and about 700 nm, for example with 1% or less of red wavelengths (i.e. 600 nm-700 nm) or with 1% or less of red wavelengths (i.e. 600 nm or longer), and wherein an amount of the first light is higher than an amount of the second light.

In the context of various embodiments, the first peak wavelength may be about 480 nm and the second peak wavelength may be about 550 nm.

In the context of various embodiments, an amount of light having the first peak wavelength may be higher than an amount of light having the second peak wavelength.

In the context of various embodiments, the amount of light having the first peak wavelength is in a range of between about 80% and about 90%, for example about 90% and the amount of light having the second peak wavelength is in a range of between about 10% and about 20%, for example about 10%.

In the context of various embodiments, the first light may have a spectrum in a wavelength range of between about 460 nm and about 570 nm, for example a spectrum spanning at least substantially throughout the wavelength range (i.e. across the entire wavelength range) or spanning across a portion of the wavelength range, for example between about 480 nm to about 550 nm. In addition, the first light may have a spectrum biased towards the blue region, for example having at least one peak wavelength in a range of between about 460 nm and about 500 nm, for example at about 480 nm, while the spectrum of the first light also extends into the green region.

In the context of various embodiments, the first light may have a first peak wavelength in a range of between about 460 nm and about 500 nm, for example between about 470 nm and about 490 nm, for example a first peak wavelength at about 480 nm±20 nm, and a second peak wavelength in a range of between about 530 nm and about 570 nm, for example a second peak wavelength at about 550 nm±20 nm.

In the context of various embodiments, an amount of light having the first peak wavelength may be higher than an amount of light having the second peak wavelength. The amount of light having the first peak wavelength may be in a range of between about 80% and about 90% and the amount of light having the second peak wavelength may be in a range of between about 10% and about 20%.

In the context of various embodiments, the first peak wavelength and the second peak wavelength may be part of a continuous spectrum or may be part of separate spectra.

In the context of various embodiments, the second light may have a spectrum in a wavelength range of between about 530 nm and about 700 nm, for example with 1% or less of red wavelengths (i.e. 600 nm-700 nm) or with 1% or less of red wavelengths (i.e. 600 nm or longer), for example a spectrum spanning at least substantially throughout the wavelength range (i.e. across the entire wavelength range) or spanning across a portion of the wavelength range, for example between about 550 nm and about 650 nm. The second light may have a peak wavelength in a range of between about 530 nm and about 570 nm, for example at about 550 nm.

In the context of various embodiments, the first light may have a first peak wavelength at about 480 nm±20 nm, and a second peak wavelength at about 550 nm±20 nm. The 550 nm green peak is near the peak or maximal sensitivity of the M-cones and substantially at the maximal spectral sensitivity of the light adapted eye so as to ensure that accommodation mediated by the M-cones lies at the mid-points of the M-cone outer segments (OS) as well as at the mid-points of the L-cones and the S-cones.

The first peak at about 480 nm is within the blue domain of the visible spectrum and near the maximal sensitivity of the S-cones and is provided so as to maximise the disparity between the photon catch at the bases of the S-cones compared to a low level of photon catch at the tips of the L-cones (for example in the absence of long wavelength red light).

The ratio of blue wavelengths to green wavelengths may be of the order of about 90% blue to about 10% green and less than about 1% red or no red.

In various embodiments, spectacle lenses and contact lenses may be designed and constructed and/or incorporate one or more filters to change the chromatic content of transmitted light so as to provide a chromatic content as described above. In other words, the changed chromatic content may have an increased content of blue light relative to red light or a decreased content of red light relative to blue light, while maintaining an adequacy of green content.

The spectacle lenses and the contact lenses may incorporate a refractive correction, and may be designed for continuous or near-continuous wear by children at risk of developing myopia or who have developed myopia or are at risk of progression of myopia. The contact lenses may be aspheric with the refractive correction provided by clear spectacle lenses having the desired refractive correction.

In various embodiments, light sources may be designed and constructed and/or modified and/or incorporate one or more filters to change the chromatic content of transmitted light so as to provide a chromatic content as described above. The light sources may be used for indoor activities (including use at home or in schools, for room lighting, illumination of white/black boards etc.), and may replace other forms of artificial lighting, so as to reduce the risk of development of childhood myopia or to reduce the risk of progression of myopia among those who have developed myopia.

In addition, light sources (e.g. reading lamps) may be designed and constructed and/or modified to incorporate light emitters, for example blue emitting LEDs or blue emitting fluorescent light sources, each with an emission spectrum having a chromatic content as described above, to be used (e.g. by children) during reading and other close work or other indoor activities.

In various embodiments, headgear for the young children to wear may be designed and constructed and/or modified to incorporate light emitters, for example with LEDs having an emission spectrum having a chromatic content as described above. The headgear may include the use of a headband mounted LED source with a parabolic reflector designed to illuminate an area involved in reading or other close work. The light intensity at the reading distance may be about 30 lux (e.g. about 3 foot candles).

In various embodiments, projection devices or display devices may be designed and constructed and/or modified and/or incorporate one or more filters to change the chromatic content of transmitted light so as to provide a chromatic content as described above, for example for use in schools.

In various embodiments, the chromatic characteristics of computer screens for use by children in schools or at home may be designed or modified so as to provide a chromatic content as described above. This may be achieved, for example, by one or more filters applied to the screen or by computer software programmed to achieve the chromaticity as described above.

Therefore, altering the chromatic characteristics of light incident on the eye by the use of appropriate filters incorporated in spectacle lenses or contact lenses or by the application to spectacle lenses of appropriate filters to provide an incident light with an increased proportion of blue light as against red light, and an adequate proportion of green light, or by the use of artificial light sources modified so that they emit a greater proportion of blue light and a reduced proportion of red light (together with an adequate proportion of green light) may prevent or minimize the occurrence of the developing eye becoming myopic or if myopia has already developed, may prevent or minimize its further progression. In schools or home, for example involving indoor conditions lit by artificial light, modification of the lighting conditions to increase the proportion of blue light as against red light, and maintaining an adequate proportion of green light, may reduce the risk of myopia or prevent its progression. Modification to the spectral composition of computer displays may provide a similar effect.

Research into possible adverse effects of light has mostly been carried out on nocturnal rodents with rod dominated retinas and using high intensities of light, beyond the intensity of light in accordance with the various embodiments. It has been shown that in diurnal animals and primates such as macaques, exposure to even intense light fails to induce retinal damage. Children, like other higher primates are probably at a reduced risk of adverse retinal effects from blue light hazard (Organisciak D T, Vaughan D K, Prog Retin Eye Res. 2019; 29:113-34)

Although exposure of the eye to intense blue light at near damaging intensities may cause retinal damage and has been suggested as playing a role in retinal degenerative disorders of the elderly (so called blue light hazard), the blue/green light with a chromatic content in accordance with various embodiments to be used clinically in the management of childhood myopia may be selected so as not to be associated with any adverse retinal effects.

The light intensity of various embodiments is about 3 foot candles, compared to light intensities which may induce retinal damage, characteristically between about 100-300 foot candles (about 1200-3000+ lux).

Furthermore, outdoor activity has been shown to protect against the development of myopia and appears to carry no adverse risk of ocular damage. The light intensity of full daylight (and not direct sunlight) lies between 10,000 and 25,000 lux (approximately 950-2,300 foot candles). Thus, the intensity of light outdoors is about 300 to 1,000 times the light intensity of various embodiments of about 3 foot candles.

The light in accordance with various embodiments has a minimum wavelength (i.e. shortest wavelength) at about 460 nm, which is longer than the wavelengths shown to carry the highest risk of retinal damage, for example near ultra violet (UV) or very short wave blue light of about 360 nm to about 430 nm.

The chromatic manipulation and the light used in accordance with various embodiments may be used during daylight hours and early evening, preferably not at night, where in animals, it has been shown that the retina is at greatest risk of light damage where light exposure is during the night with a peak sensitivity at 1 am.

EXAMPLES

Modifying the ratios of long to short wavelength light while maintaining an adequate proportion of green light may ensure that the focal plane for the green wavelengths from distant objects lie midway along all of the photoreceptor OS. Such an approach may help to determine the effects of chromaticity on ocular and refractive development and its refractive status.

In order to obtain a significant imbalance between photon density at the tips and bases of the OS, chicks were raised in light that had an adequate proportion of green light to maintain the focus of green wavelengths in the mid-points of all OS. In addition to the green light, there was a preponderance of either red light or blue light (e.g. having an excess red light or an excess blue light).

Although there are differences between avian and mammalian eyes, the chick has a cone dominated retina and a spectral sensitivity curve that substantially matches that in the human, although determined by five colour responsive cones (Pask C, Stacey A., Vision Res 1998; 38:953-961) compared to the three types of cones in the human retina.

The young chick eye may respond quickly to alterations in the visual input, visual deprivation for example, thereby causing myopia within a period of two weeks.

Figure 5A:
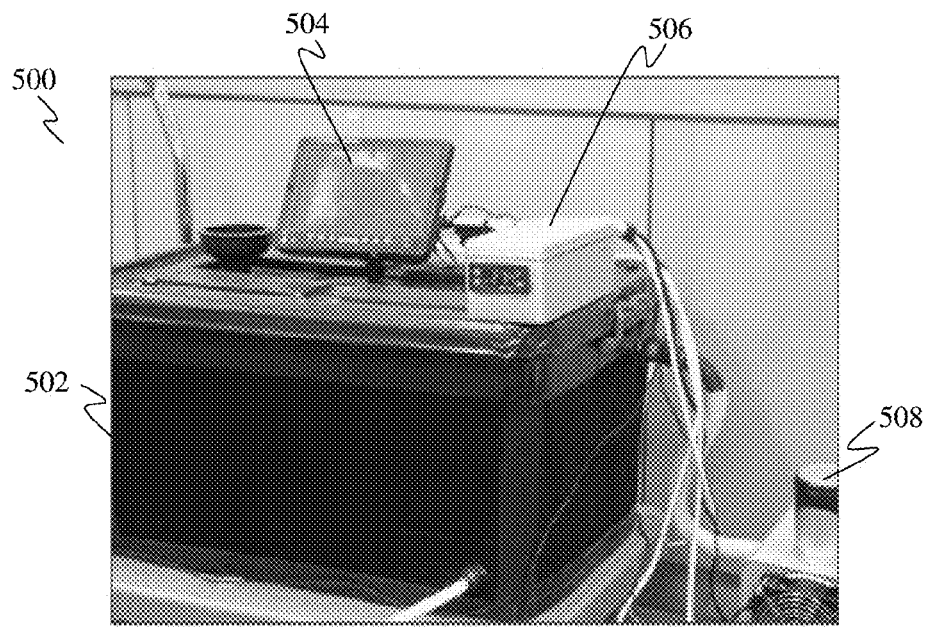
Figure 5B:
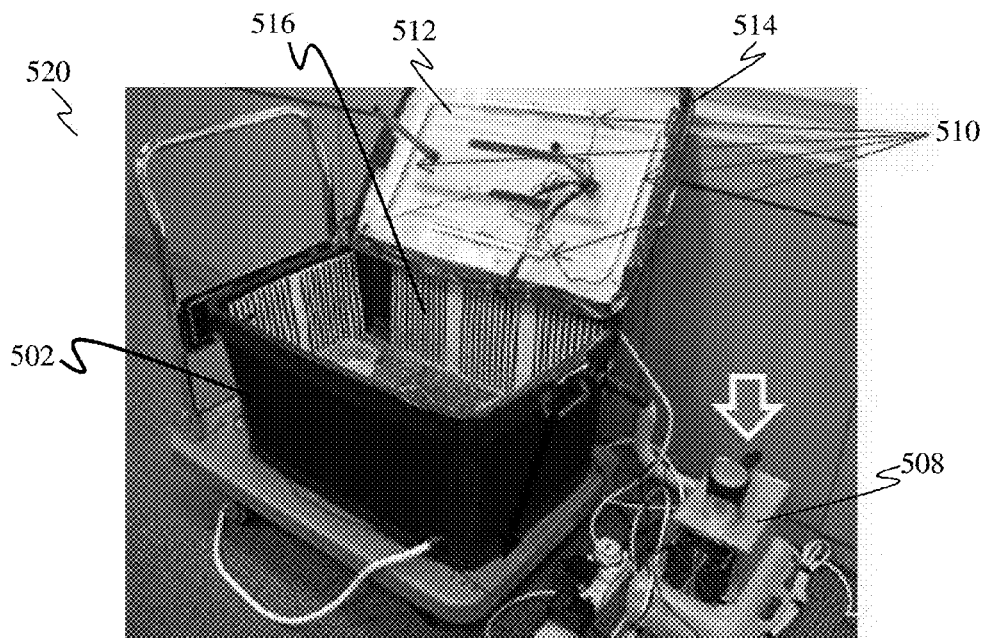
FIG. 5B shows a photograph of an interior of the enclosure, according to various embodiments.

FIG. 5A shows a photograph 500 of an enclosure 502 and a system for chick rearing, while FIG. 5B shows a photograph 520 of an interior of the enclosure 502, according to various embodiments. The system may include a closed-circuit television (CCTV) 504, a temperature control system 506 (including a temperature monitor and a temperature controller) and a lighting and heating controller 508.

The enclosure 502 may be used for chick rearing in differing chromatic conditions. The enclosure 502 is light-tight and is illuminated by four banks or arrays of light emitting diodes (LEDs) 510 in the roof of the enclosure 502 (e.g. on an inner surface 512 of the enclosure lid 514). Three different lighting conditions, each with a 12 hour on/12 hour off periodicity were used in three different experimental conditions.

The inner walls of the enclosure 502 were lined with alternating black and white vertical stripes 516 to which the chicks accommodate preferentially. The black and white vertical stripes 516 had a spatial frequency of about 4-8 cycles/degree, and depending on the location of the respective chick within the enclosure 502, the black and white vertical stripes 516 provided light with a spatial frequency of 4-8 cycles/degree.

The chicks were supplied with a thermostatically controlled air supply at temperatures between about 28° C. and about 32° C. A remote supply of food and water were provided ad lib without affecting the lighting conditions.

Cleaning of the enclosure was achieved with a remote cleaning system by means of a built-in cleaning and venting system, without the need to open the enclosure 502.

During rearing over a period of time, for example over a 14-day to 28-day period or a 42-day period, chick behaviour and health were kept under observation and monitored via the CCTV 504.

Batches of day-old chicks were raised under white, red or blue wide spectrum lighting conditions for about 2 to 4 weeks, and the refraction of each eye was determined by streak retinoscopy and by computerised infrared photorefraction. Ocular dimensions were determined by ultrasonography (Sonomed 1500).

Lighting of the enclosure 502 was achieved using the banks of light emitting diodes (LEDs) 510 emitting preferentially white, red or blue light. Four banks of LEDs 510 were arranged in the roof of the enclosure 502 with a disposition or arrangement to ensure at least substantially even illumination of the interior of the enclosure 502. Each strip or bank of LEDs may contain about 30 separate LEDs with at least substantially similar emission properties. However, it should be appreciated that each strip of LEDs may contain any number of LEDs in a range of between 10 LEDs and 50 LEDs, for example between 10 LEDs and 30 LEDs or between 20 LEDs and 40 LEDs.

Luminance at the centre of the enclosure 502 measured with a colour sensitive photometer (LX107, Digital Instruments LT Lutron, Taiwan) was at least substantially equal for red and blue lighting conditions at about 3.1 and 3.2 foot candles respectively. Luminance from the white emitting LEDs at the centre of the enclosure 502 was about 10.9 foot candles.

Figure 6:
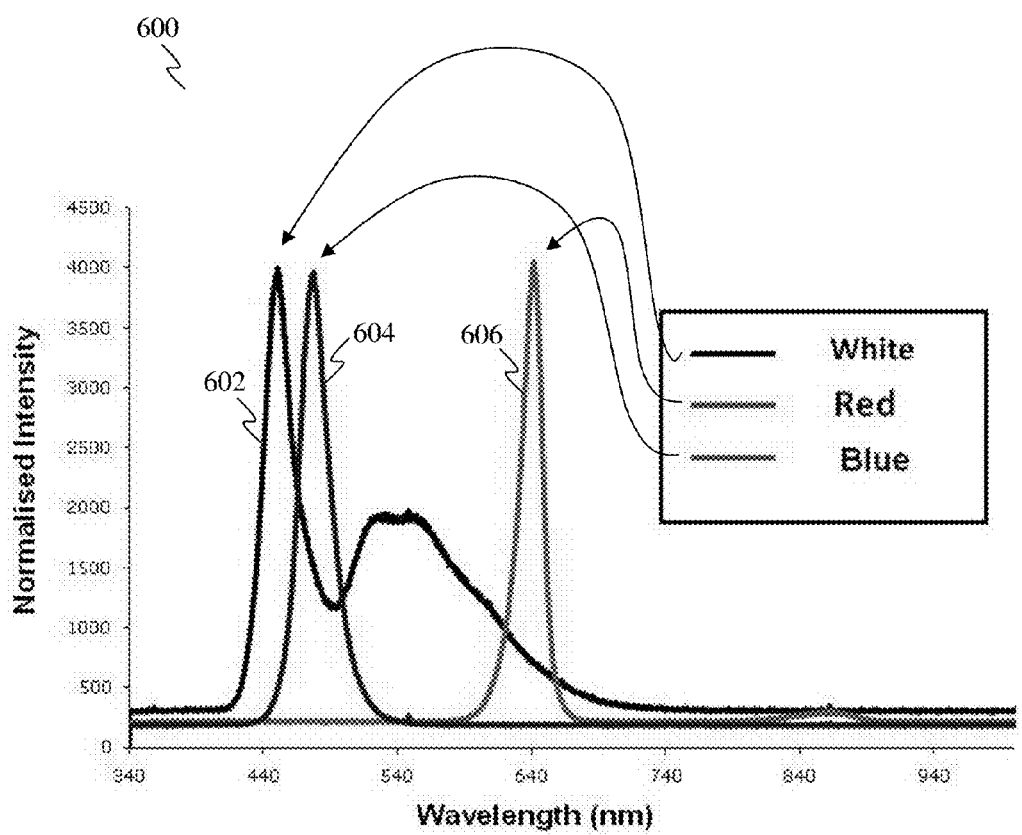
FIG. 6 shows a plot illustrating the emission spectra of the light emitting diodes (LEDs) used for chick rearing according to various embodiments.

FIG. 6 shows a plot 600 illustrating the emission spectra of the light emitting diodes (LEDs) used for chick rearing, according to various embodiments. The spectra were determined by spectroscopic analysis with a high resolution spectrometer (HR 2000, Ocean Optics, Dunedin, Fla., USA). The plot 600 shows the emission spectra for the white LEDs 602, the blue LEDs 604 and the red LEDs 606.

As shown in FIG. 6, the spectral emission of the blue LEDs 604 is between about 430 nm and about 550 nm with a sharp peak at about 480 nm and a short tail into the green region to about 540 nm, while the spectral emission of the red LEDs 606 is between about 550 nm and about 700 nm with a sharp peak at about 640 nm. The spectral emission of the white LEDs 602 is between about 410 nm and about 840 nm, with a sharp peak at about 450 nm in the blue region of the spectrum and a broad area of increased emission at between about 500 nm and about 700 nm having a broad peak at about 536 nm in the green region and an extended emission into the far-red region.

All three types of LEDs have some green emission, with the red LEDs having the least amount of green emission. While the proportion of green in the emission of the red emitting LEDs may be low, the green emission is near the peak of the cone spectral sensitivity curve of a human such that a small amount of green light may be sufficient to provide effect on accommodation of the eye, and which is supported by the results of raising chicks in the three different lighting conditions as described below.

Figure 7:
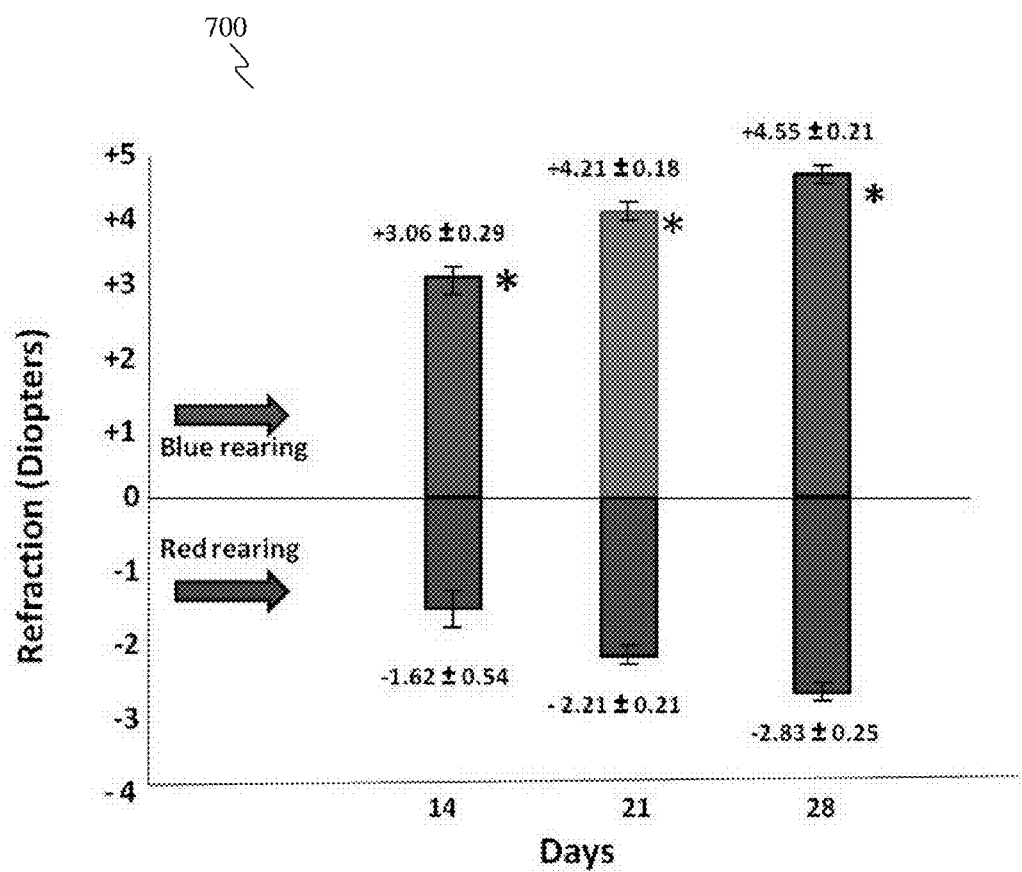
FIG. 7 shows a plot of histograms of mean refractive status of randomly selected eyes from each chick reared for 14 days, 21 days or 28 days in predominately red or predominately blue lighting conditions.

The refractive results of raising batches of chicks for about 14 days, about 21 days and about 28 days in red (+green) or blue (+green) lighting conditions are shown in Table 1 and FIG. 7. It can be seen that chicks raised in predominantly red light became myopic, while those raised in predominantly blue light became hyperopic with a significant difference between mean refractions in these two conditions ($p<0.001$) at all three time intervals, while excess blue resulted in hyperopia with a significant difference between the mean refractions in these two chromatic conditions ($p<0.001$). Both right and left eyes in individual chicks behaved similarly as the results shown in Table 1

Also as shown in Table 1, the myopic eyes resulting from red light rearing had longer vitreous chamber lengths than the vitreous chamber in the blue-raised hyperopic eyes, indicating that the myopia was axial myopia, similar to the type of myopia generally seen in myopic human children.

TABLE 1

Refractive status of the eyes of chicks of rearing in either excess red or excess blue lighting conditions.

| Rearing Light | Refractive (dioptres) (mean ± SD) | | | Vitreous length (mm) (mean ± SD) at 14 days |
|---|---|---|---|---|
| | 14 days | 21 days | 28 days | |
| Excess Red | −1.62 ± 0.54 | −2.21 ± 0.21 | −2.83 ± 0.25 | 5.55 ± 0.11 |
| Excess Blue | +3.06 ± 0.29 | +4.21 ± 0.18 | +4.55 ± 0.21 | 4.73 ± 0.72 |

FIG. 7 shows a plot 700 of histograms of mean refractive status of randomly selected eyes from each chick reared for 14 days, 21 days or 28 days in predominately red or predominately blue lighting conditions. One eye was chosen at random from each chick at each time interval.

As shown in FIG. 7, those raised in red light (with some green) were myopic at each time interval, with increasing severity over a 28-day period, while those raised in blue light (with some green) were hyperopic at each time interval, with progressive hyperopia over a 28-day period. Mean values and standard deviations, in dioptres, are indicated for each combination of duration and chromatic nature of the light in which chicks were raised. In FIG. 7, "*" indicates probability difference ($p<0.001$) between red light and blue light rearing at each time interval.

The myopic chicks raised in predominantly red light had significantly longer vitreous chamber lengths at 14 days than the hyperopic chicks raised in predominantly blue light ($p<0.01$), as shown in Table 1.

In addition, chicks were raised in red light for 21 days and refracted at 14 days and 21 days at which time interval the degree of induced myopia was determined. The chicks were then returned to the enclosure for a further 21 days in blue lighting conditions and refracted at 14 days and 21 days to determine whether the myopia induced by red light rearing may be reversed to hyperopia by blue light rearing.

Figure 8:
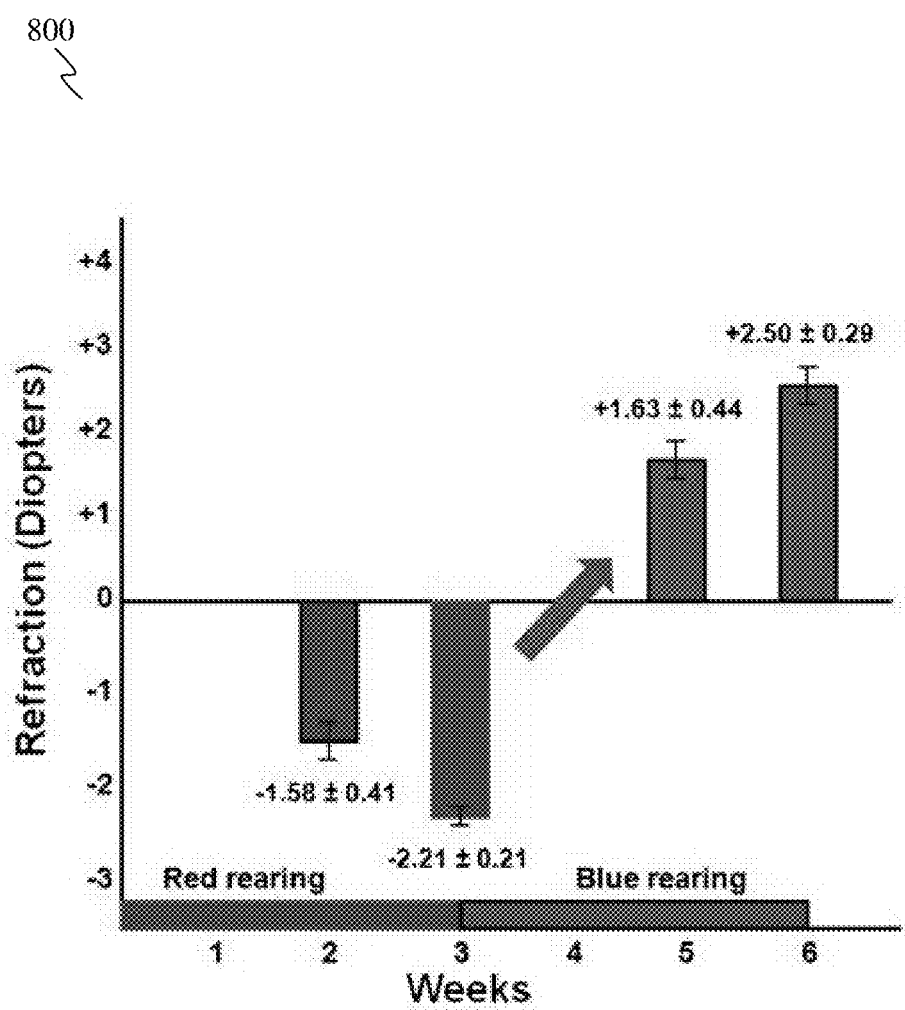
FIG. 8 shows a plot of histograms of mean refractive status of randomly selected eyes from each chick raised for 21 days in predominantly red light and subsequently for 21 days in predominantly blue light conditions.

FIG. 8 shows a plot 800 of histograms of mean refractive status of randomly selected eyes from each chick raised for 21 days in predominantly red light and subsequently for 21 days in predominantly blue light conditions. One eye was chosen at random from each chick at each time interval Mean values and standard deviations, in dioptres, are indicated for each combination of duration and chromatic nature of the light in which chicks were raised.

In excess red light rearing, the eyes became progressively myopic but when the lighting was changed to an excess of blue, the previous progressive myopia was converted to progressive hyperopia. Mean values and standard deviations, in dioptres, are indicated for each combination of duration and chromatic nature of the light in which chicks were raised.

Furthermore, chicks were raised in blue light for 21 days and refracted at 14 days and 21 days at which time interval the degree of induced hyperopia was determined. The chicks were then returned to the enclosure for a further 21 days in red lighting conditions and refracted at 14 days and 21 days to determine whether the hyperopia induced by blue light rearing may be converted to myopia by red light rearing.

Figure 9:
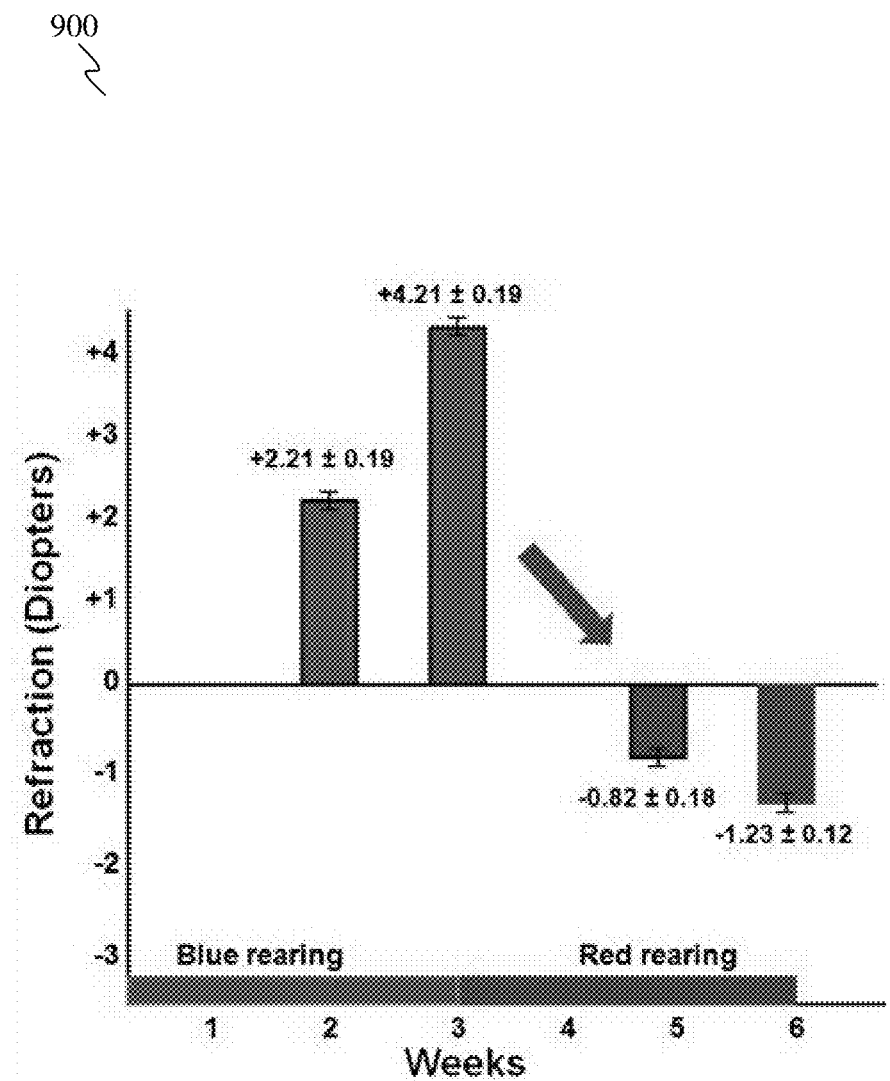
FIG. 9 shows a plot of histograms of mean refractive status of randomly selected eyes from each chick raised for 21 days in predominantly blue light and subsequently for 21 days in predominantly red light conditions.

FIG. 9 shows a plot 900 of histograms of mean refractive status of randomly selected eyes from each chick raised for 21 days in predominantly blue light and subsequently for 21 days in predominantly red light conditions. One eye was chosen at random from each chick at each time interval. Mean values and standard deviations, in dioptres, are indicated for each combination of duration and chromatic nature of the light in which chicks were raised.

In excess blue light rearing, the eyes became progressively hyperopic but this was reversed to progressive myopia by subsequent excess blue light rearing.

Excess blue light rearing is more effective in inducing hyperopia than was excess red light in inducing myopia. Additionally, excess blue light was more effective in converting red light-induced myopia to hyperopia than was excess red light in converting blue light-induced hyperopia to myopia.

Therefore, it is shown in chicks that an alteration of the chromaticity of light in which they are reared may induce myopia (excess red light), or hyperopia (excess blue light) and that excess red light-induced myopia may be converted to hyperopia by subsequent exposure to excess blue light.

Separately, it was determined that a short period of 2 hours of excess blue light rearing, with 10 hours of excess red light rearing and 12 hours of darkness may prevent or minimise the myopia that is expected from the longer period of red light rearing.

This shows that a short exposure per day to excess blue wavelengths may be sufficient to prevent or minimise myopia in vulnerable children (e.g. those with a family history of myopia) or to halt or slow the progression of myopia in those children who had already developed myopia.

Discussion

The results obtained from raising chicks in controlled conditions of predominantly red or predominantly blue lighting provide support that the growth of the young eye may be conditioned by the vergence of light traversing the retina and more specifically by the relative photon catch in the tips and bases of the photoreceptor OS. In conditions of convergent light traversing the retina (hyperopic blur) that may result from lens-induced hyperopic blur or from the effects of excess red light that is also convergent as it reaches its point of focus just beyond the tips of the OS, the response is ocular elongation and the development of axial myopia.

A difference exists between the pattern of eye growth resulting from lens-induced ametropia and that from an excess of red or of blue wavelengths in the light incident upon the eye. In the young eye, the altered eye growth induced by lenses ceases when the eye has grown to compensate for the strength and sign of the lens inducing ametropia. For example, the wearing of a +6 D lens inducing a hyperopia of +6 D and the wearing of a −6 D lens inducing a myopia of −6 D, may not result in any further change in refraction with longer periods of lens wear.

In contrast, the effects of chromaticity are continuous. Where the young animal eye or the young human eye is exposed to excess red light, the eye continues to elongate where the excess of red light continues to be present and where the young eye retains its plasticity and its ability to alter its growth pattern in response to environmental factors such as exposure to light of an abnormal chromaticity.

In the chick eye, it has been estimated that the difference in vergence of red light as compared with blue is about 1.5 dioptres (Mandelman T, Sivak J G. Vision Res 1983; 12:1555-59; Rohrer B, et al., J Physiol 1992; 449:363-376). The results in accordance with various embodiments show a difference in vergence between the red and green light or between the blue and green light, each of which may affect the pattern of ocular growth and refractive development, of the order of about 0.75 dioptres. In the case of induced hyperopia, with a refractive error of around +3.0 D (+3.0 dioptres) at about 14 days and +4.50 D at about 28 days for those chicks raised in predominantly blue light (with about 40% green content), the effect of the difference between the blue and green wavelengths resulted in a continuously induced change in refraction in the chick eye in the order of over +1.00 D per week. The induced myopia in chicks raised in predominantly red light was of the order of about 0.75 D per week, although this result may be affected by the presence of about 20% blue region light in the light emitted by the red LEDs.

The mechanism by which the eye is able to respond to an imbalance in the summated photon densities at the tips and bases of the OS of red sensitive and blue sensitive cones respectively may require further determination. Nevertheless, it has been determined that photons directed laterally into isolated receptor OS generate excitation of the OS limited to a narrow band (3 µm) of the OS with no distal or proximal diffusion (Lamb T D, et al., J Physiol 1981; 319:463-96), a situation that would be necessary if the retina were able to differentiate between photon catch in the distal as compared with the proximal OS.

Outdoor activity may protect against myopia progression while indoor activity and close work (e.g. close work under tungsten illumination), such as involving reading and writing, may be associated with the development of myopia. Indoor activity may be a factor causing the development of myopia irrespective of close work.

In considering the role of indoor activity in the etiology of childhood myopia, generally much indoor activity is conducted in artificial light, for example with tungsten lighting. Tungsten incandescent lamps have a continuous emission spectrum from about 300 nm to about 1400 nm (beyond the visible spectrum) with most of the emission at about 600 nm or more (red to infrared). Their emission spectrum contains a small proportion of green emission and very little blue, i.e. the spectral emission of tungsten lamps bears some similarity to that emitted by the red emitting LEDs that caused chicks to become myopic.

Currently, tungsten incandescent lamps are being replaced by long-lasting energy saving fluorescent lamps. While these lamps characteristically emit ultraviolet light and some blue wavelengths like most fluorescent lamps, they have a discontinuous emission spectrum with several intense peaks in the green and red portions of the visible spectrum the emission pattern depending on the phosphors used to create the fluorescent output.

Figure 10:
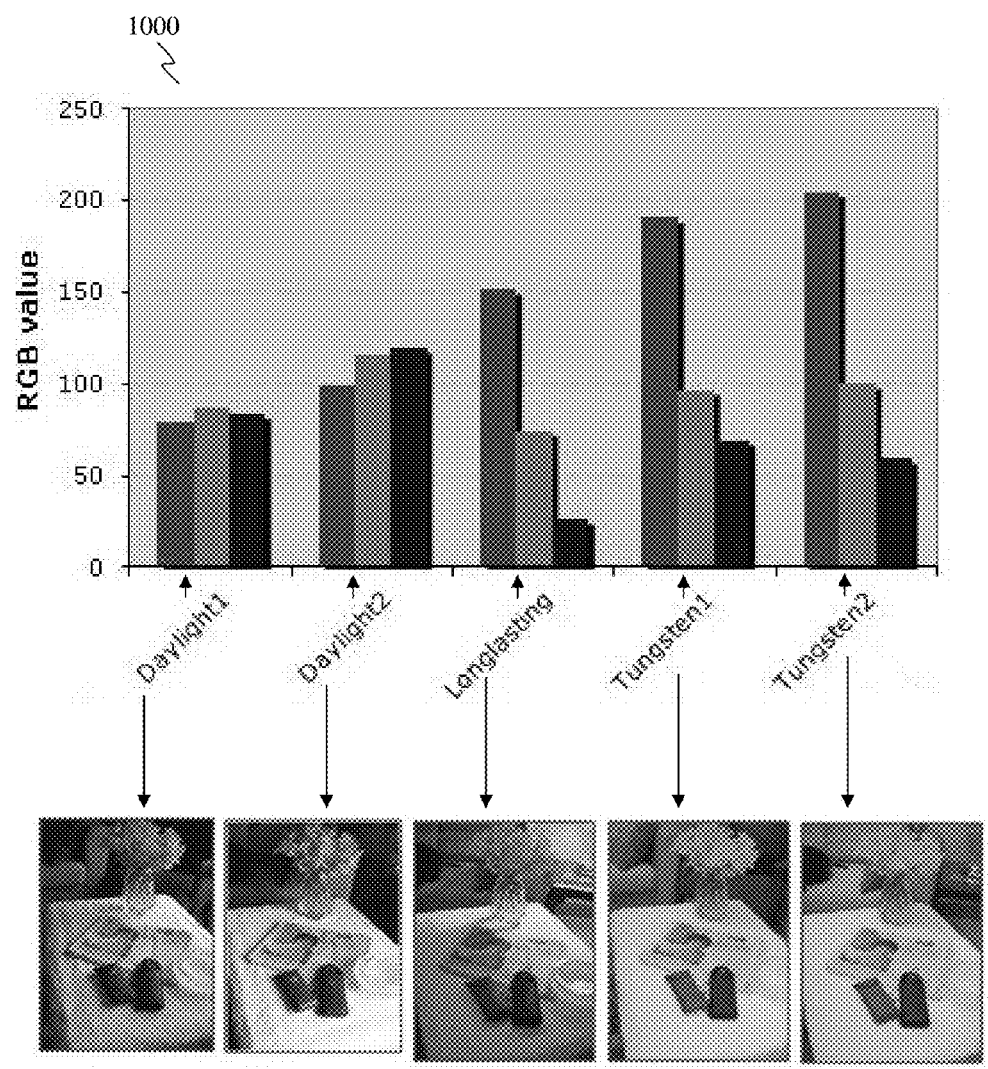
FIG. 10 shows a plot of histograms of the chromatic content of a same indoor scene lit by different illumination sources.
Figure 11A:
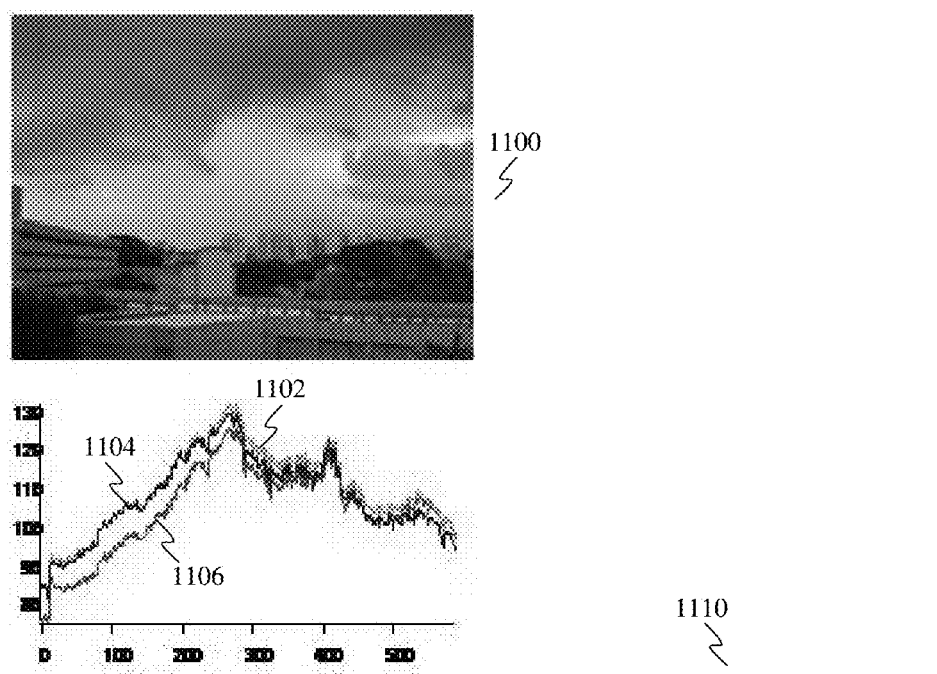
FIGS. 11A to 11E show photographs of various outdoor scenes with their respective chromatic content.
Figure 11B:
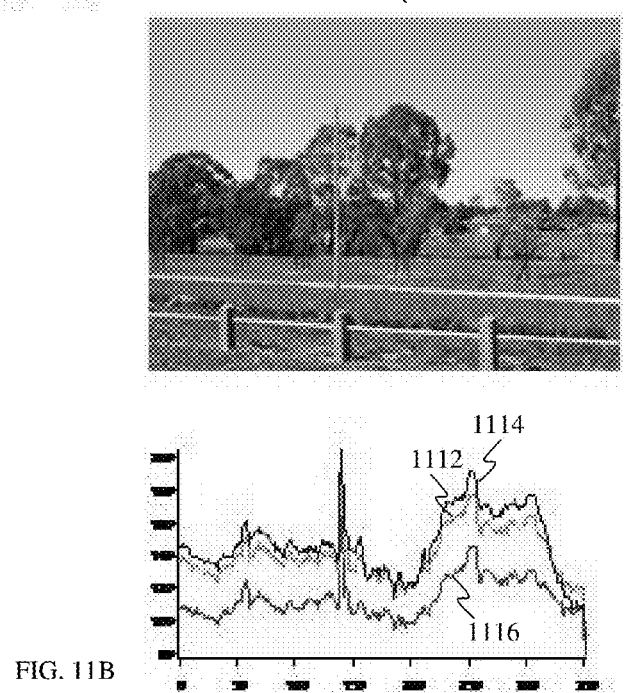
Figures 11C, 11D:
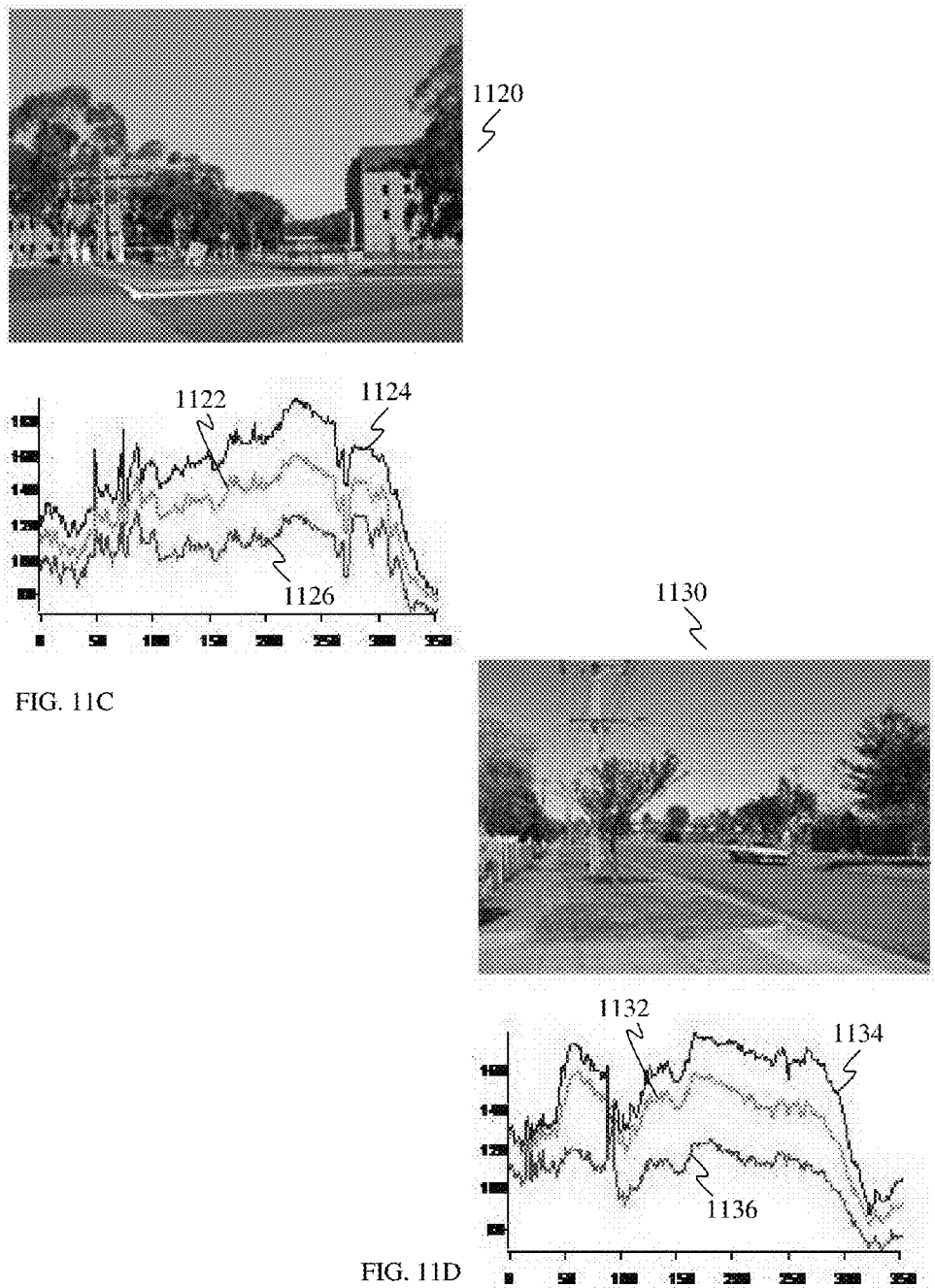
Figure 11E:
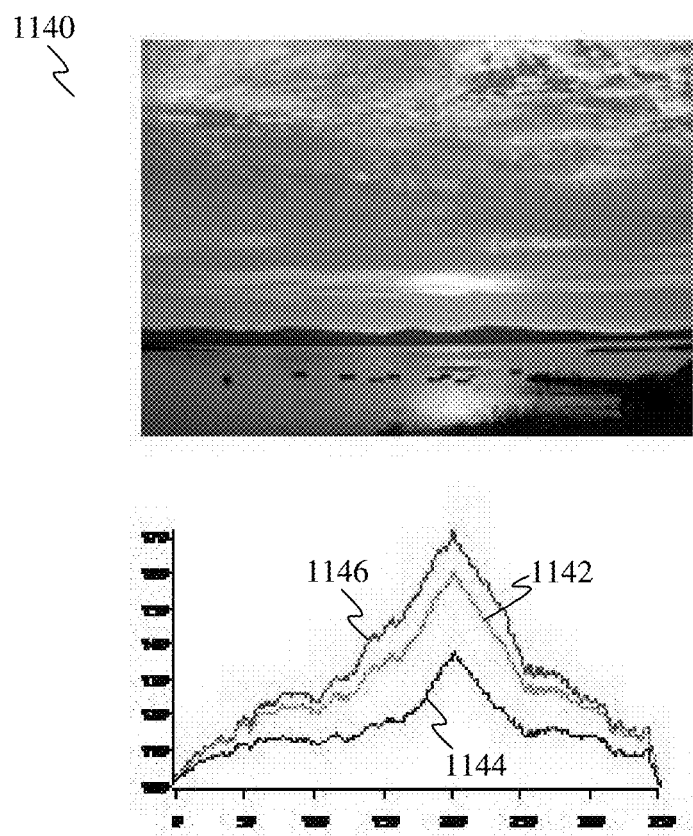

Photography of an indoor scene in different intensities of daylight, tungsten lighting and in low energy fluorescent lighting was carried out to illustrate graphically the blue content of daylight and the red content of both tungsten and low energy fluorescent lighting and the relative amounts of red, green or blue wavelengths for each condition of illumination are as shown in FIG. 10 where the indoor scene was photographed in dull or bright diffuse daylight, with tungsten illumination at two different intensities and with illumination from low energy longlasting fluorescent lamps.

FIG. 10 shows a plot 1000 of histograms of the chromatic content of a same indoor scene lit by different illumination sources, for example lit by cloudy daylight (Daylight 1), bright daylight (Daylight 2), a low energy long-life fluorescence illumination source (Longlasting), one tungsten light (Tungsten 1) and two tungsten lights (Tungsten 2) providing brighter illumination. Daylight lighting is predominantly blue while artificial lighting is predominantly red.

In FIG. 10, for each illumination (e.g. Daylight 1, Longlasting, etc.), the left-most result represents the proportion of red region light, the middle result represents the proportion of green region light and the right-most result represents the blue region light.

As shown in FIG. 10, the proportions of red, green and blue region lights are substantially equal in dull cloudy daylight (Daylight 1) with a ratio of red 28%:green 37%: blue 35%, and there is a slight increase in the green and blue region lights in bright daylight (Daylight 2) with a ratio of red 28.5%:green 34.5%:blue 37%. There was a small preponderance of blue and green region lights (i.e. blue and green contents) for daylight illumination.

In contrast, longlife fluorescence and tungsten illuminations have a preponderance of red region light (i.e. red content), that increases with brighter tungsten lighting. The low energy long-lasting fluorescent lighting (Longlasting) provided illumination of a ratio of red 60%:green 32%:blue 8%. One tungsten light illumination provided illumination of a ratio of red 54%:green 27%:blue 19%, while illumination from two tungsten lamps showed a ratio of red 58%: green 29%:blue 13%.

FIGS. 11A to 11E show photographs of various outdoor scenes with their respective chromatic content. The respective chromatic content of a variety of outdoor scenes show considerable variation in the proportions of red, green or blue content.

The photograph 1100 of a cloudy sky shows a substantially equal contribution from each colour of green 1102, blue 1104 and red 1106, the photographs 1110, 1120, 1130, of sunlit open scenes show a preponderance of blue and green colours (respectively 1112 and 1114, 1122 and 1124, and 1132 and 1134) and a reduced proportion of red (respectively 1116, 1126, 1136), while the photograph 1140 of a sunset scene shows a preponderance of red colour 1146 compared to green 1142 and blue 1144.

Outdoor activity may protect against myopia progression while indoor activity and close work (e.g. close work under tungsten illumination), such as involving reading and writing, may be associated with the development of myopia. Indoor activity may be a factor causing the development of myopia irrespective of close work.

This is because indoor activity (including close work), for example undertaken in artificial lighting based on tungsten or long lasting low energy fluorescent lamps having a spectral composition with a preponderance of long wavelength red light and a reduced blue content, in addition to a proportion of green light, mimics the conditions of chick rearing as described above that leads to the development of myopia.

The protective effect against myopia associated with outdoor activity, may be due to the chromaticity of outdoor lighting that may contain a preponderance of blue light, an adequate content of green wavelengths and a low red content, thus mimicking the spectral composition of light that led to the development of hyperopia in chicks that similarly may be protective against myopia in human children, as has been demonstrated in chicks as described above.

The chromatic content of light incident upon the eye may determine the ocular and refractive development. The results as described above may be applicable in children, such that modification of the chromatic composition of light to which the eye is exposed by increasing the proportion of blue light as against that of red light and including an adequacy of green light so as to maintain accommodation so that the focal plane for the green light may pass through the mid-points of the photoreceptor outer segments, may ensure a preponderance of photon density in the OS bases that may be protective against the development of myopia or its progression.

The conversion to hyperopia by a change (e.g. a short exposure to blue light) to blue light rearing from myopia induced by red light rearing in chick as shown in FIG. 8, may be applicable in human children where myopia developed in human children may be reversed by chromatic manipulation of visual images at any early age. The amount and duration of blue light exposure required to overcome the myopia induced by excessive exposure to longer wavelength red light from artificial lighting indoors may be such that it is insufficient to affect the retina adversely (e.g. "blue light hazard").

Therefore, the inclusion of green light to maintain the focal plane of the retinal image in the mid-points of the photoreceptor outer segments (OS) together with an increase in the proportion of blue light focused in front of this focal plane and a decrease in the proportion of red light focused behind this focal plane may cause the young eye to develop towards hyperopia. Altering the balance of blue and red light in favour of an increased proportion of red light (in the presence of an adequate proportion of green light) has the opposite effect, causing the development of myopia. In addition, myopia induced in the young eye by an excess of red light may be subsequently reversed by exposure to an excess of blue light providing support for the use of chromatic manipulation in the prevention of childhood myopia or slowing or halting the progress of myopia that has already developed.

In one embodiment, an ocular lens is provided. The ocular lens may include an optical filter configured to change a chromaticity of light impinging on the ocular lens so as to transmit a filtered light to an eye of a viewer, wherein the filtered light includes a first light having a first peak wavelength in a range of between about 460 nm and about 490 nm and a second peak wavelength in a range of between about 490 nm and about 550 nm.

In an example implementation of the embodiment, the first peak wavelength may be about 480 nm and the second peak wavelength is about 550 nm.

In an example implementation of the embodiment, an amount of light having the first peak wavelength may be higher than an amount of light having the second peak wavelength.

In an example implementation of the embodiment, the amount of light having the first peak wavelength may be in a range of between about 80% and about 90% and the amount of light having the second peak wavelength may be in a range of between about 10% and about 20%.

In an example implementation of the embodiment, the optical filter may be disposed on an outer surface of the ocular lens, distal to the eye of the viewer.

In an example implementation of the embodiment, the ocular lens may be further configured for refractive correction.

In an example implementation of the embodiment, the ocular lens may be an aspheric lens.

In an example implementation of the embodiment, the ocular lens may be a spectacle lens or a contact lens.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An ocular lens comprising an optical filter configured to change a chromaticity of light impinging on the ocular lens so as to transmit a filtered light to an eye of a viewer, the filtered light having a proportion of blue light that is higher than a proportion of red light, wherein
    the filtered light has a proportion of green light,
    the blue light has a peak wavelength at about 480 nm within a range of blue wavelengths from about 460 nm to about 500 nm and the green light has a peak wavelength at about 550 nm within a range of green wavelengths from about 530 nm to about 570 nm, and
    the proportion of blue light is between about 80% and about 90%, the proportion of green light is between about 10% and about 20%, and the proportion of red light is less than about 1%.
2. The ocular lens as claimed in claim 1, wherein the ocular lens is a spectacle lens or a contact lens.

* * * * *